(12) United States Patent
Wright et al.

(10) Patent No.: US 6,189,305 B1
(45) Date of Patent: *Feb. 20, 2001

(54) POWER MOWER WITH RIDING PLATFORM FOR SUPPORTING STANDING-OPERATOR

(75) Inventors: William R. Wright, Clarksburg; James Velke, Poolesville, both of MD (US)

(73) Assignee: Wright Manufacturing, Inc., Gaithersburg, MD (US)

( * ) Notice: Under 35 U.S.C. 154(b), the term of this patent shall be extended for 0 days.

This patent is subject to a terminal disclaimer.

(21) Appl. No.: 09/543,768

(22) Filed: Apr. 5, 2000

Related U.S. Application Data

(63) Continuation of application No. 09/412,587, filed on Oct. 5, 1999, now Pat. No. 6,085,504, which is a continuation of application No. 09/044,982, filed on Mar. 20, 1998, now Pat. No. 5,964,082, which is a continuation of application No. 08/932,932, filed on Sep. 19, 1997, now Pat. No. 5,765,347, which is a continuation of application No. 08/726,927, filed on Oct. 3, 1996, now abandoned, which is a continuation of application No. 08/615,518, filed on Mar. 11, 1996, now Pat. No. 5,600,944, which is a continuation of application No. 08/357,740, filed on Dec. 16, 1994, now Pat. No. 5,507,138.

(51) Int. Cl.⁷ .................................................. A01D 34/82
(52) U.S. Cl. ......................... 56/14.7; 56/16.7; 180/6.48
(58) Field of Search ................................. 56/14.7, 15.5, 56/16.7, 15.4, 10.1, 17.5; 180/6.48, 6.5, 6.62

(56) References Cited

U.S. PATENT DOCUMENTS

| | | |
|---|---|---|
| Re. 34,057 | 9/1992 | Middlesworth . |
| 1,764,971 | 6/1930 | Nilson . |
| 2,354,576 | 7/1944 | Clark . |
| 2,583,358 | 1/1952 | Cesan . |
| 3,190,672 | 6/1965 | Swanson . |

(List continued on next page.)

FOREIGN PATENT DOCUMENTS 597049   4/1993   (JP) .

OTHER PUBLICATIONS

Excel Compacts 251K/251K T/S/260K T/S (1990.
Excel Hustler 261 (1983).
Excel Hustler 65 and Hustler 36 (1965).
Mar. 16, 1999 deposition of Joseph E. Berrios, including pp. 1–60 and Exs. 1, 2, and 4 thereof. [Mar. 16, 1999.]

*Primary Examiner*—H. Shackelford
(74) *Attorney, Agent, or Firm*—Nixon & Vanderhye P.C.

(57) ABSTRACT

A zero-turning-radius power lawn mower for operation by a standing-occupant includes first and second independently driven and controlled rear drive wheels mounted on separate drive axles. A riding platform for supporting the standing-occupant or operator is located between the first and second rear drive wheels. The rear drive wheels are independently driveable in both the forward and reverse directions at variable speeds so as to allow for substantially zero-radius-turning of the mower about a central turning point. The riding platform is positioned at this turning point so that the standing-occupant remains substantially unaffected by centrifugal force created during approximate zero-radius-turning of the mower thereby allowing the mower to take such turns at higher speeds. Such positioning of the platform also provides for improved maneuverability, reduces the likelihood that the platform will bottom out when the mower goes over bumps, and creates a safer mower less susceptible to tipping due to the resulting low center of gravity. The low center of gravity created by the position of the riding platform for the standing-operator also results in the mower having improved traction and being less likely to pop "wheelies" upon acceleration.

2 Claims, 2 Drawing Sheets

U.S. PATENT DOCUMENTS

| | | |
|---|---|---|
| 3,336,042 | 8/1967 | Southall . |
| 3,455,404 | 7/1969 | Hansen . |
| 3,483,682 | 12/1969 | Root . |
| 3,485,314 | 12/1969 | Herr . |
| 4,175,762 | 11/1979 | Vaughn et al. . |
| 4,316,356 | 2/1982 | Planeta . |
| 4,395,865 | 8/1983 | Davis, Jr. et al. . |
| 4,429,515 | 2/1984 | Davis, Jr. et al. . |
| 4,487,006 | 12/1984 | Scag . |
| 4,558,558 | 12/1985 | Horner, Jr. et al. . |
| 4,709,541 | 12/1987 | Broman et al. . |
| 4,715,168 | 12/1987 | Oxley . |
| 4,787,646 | 11/1988 | Kamlukin et al. . |
| 4,828,282 | 5/1989 | Pinto . |
| 4,874,055 | 10/1989 | Beer . |
| 4,878,339 | 11/1989 | Mariel et al. . |
| 4,885,903 | 12/1989 | Scag . |
| 4,920,733 | 5/1990 | Berrios . |
| 4,967,543 | 11/1990 | Scag et al. . |
| 4,991,382 | 2/1991 | Scag . |
| 4,998,948 | 3/1991 | Osterling . |
| 5,004,251 | 4/1991 | Velke et al. . |
| 5,042,238 | 8/1991 | White, III et al. . |
| 5,077,959 | 1/1992 | Wenzel . |
| 5,118,123 | 6/1992 | Betrock . |
| 5,119,619 | 6/1992 | Zappia . |
| 5,131,483 | 7/1992 | Parkes . |
| 5,388,850 | 2/1995 | Simone . |
| 5,413,364 | 5/1995 | Hafendorfen . |
| 5,463,853 | 11/1995 | Santoli et al. . |
| 5,507,138 | 4/1996 | Wright et al. . |
| 5,600,944 | 2/1997 | Wright et al. . |
| 5,653,466 | 8/1997 | Berrios . |
| 5,765,347 | 6/1998 | Wright et al. . |
| 5,913,802 * | 6/1999 | Mullet et al. .......................... 56/10.8 |
| 5,964,082 | 10/1999 | Wright et al. . |
| 6,085,504 * | 7/2000 | Wright et al. . |
| 6,094,897 * | 7/2000 | Velke et al. . |

\* cited by examiner

POWER MOWER WITH RIDING PLATFORM FOR SUPPORTING STANDING-OPERATOR

This is a continuation of application Ser. No. 09/412,587, filed Oct. 5, 1999, now U.S. Pat. No. 6,085,504, which is a continuation of Ser. No. 09/044,982, filed Mar. 20, 1998, now U.S. Pat. No. 5,964,082, which is a continuation of U.S. patent application Ser. No. 08/932,932, filed Sep. 19, 1997, now U.S. Pat. No. 5,765,347, which is a continuation of U.S. patent application Ser. No. 08/726,927, filed Oct. 3, 1996, now abandoned, which is a continuation of U.S. patent application Ser. No. 08/615,518, filed Mar. 11, 1996, now U.S. Pat. No. 5,600,944, which is a continuation of U.S. patent application Ser. No. 08/357,740, filed Dec. 16, 1994, now U.S. Pat. No. 5,507,138, the entire contents of which are all hereby incorporated by reference in this application.

This invention relates to a power driven device. More particularly, this invention relates to a power lawn mower including a riding platform for supporting a standing-operator.

BACKGROUND OF THE INVENTION

Conventional hydraulically driven or hydrostatically controlled machines such as power lawn mowers include a pair of drive wheels, each of which is independently operated by a hydraulic or hydrostatic pump coupled to the mower's engine. A corresponding motor is provided for each drive wheel, each motor being powered by one of the pumps. Each pump includes a control lever for regulating fluid pressure and direction to its corresponding motor. In such a manner the drive wheels of the power device (e.g. lawn mower) are independently controlled so that each may be rotated at variable speeds in both forward and reverse directions.

Accordingly, each drive wheel of hydrostatically controlled mowers may be driven in either the forward or reverse direction and the mower may therefore be turned through various angles. Hand levers for manipulation by the operator on such mowers are typically provided on handle members for moving the individual pump control levers into desired positions. The above described power lawn mowers are commonly referred to as zero-turning-radius mowers because if operated in a particular or predetermined manner, the right drive wheel and left drive wheel may be rotated in opposite directions at similar speeds thereby allowing the mower to conduct approximate zero-radius turns about a central point located between the drive wheels. This, of course, provides for improved maneuverability in tight environments. Exemplary zero-turning-radius mowers are disclosed, for example, in U.S. Pat. Nos. 5,077,959; 4,967,543; 4,991,382; and 4,920,733.

Conventional power mowers are generally divided into three separate categories: (i) self-propelled walk-behind mowers; (ii) mowers operated by a seated occupant; and (iii) mowers operated by a standing-occupant.

U.S. Pat. Nos. 5,077,959; 4,967,543; 4,991,382 and 4,920,733 disclose typical walk-behind power mowers including hydrostatically or hydraulically controlled rear drive wheels. Unfortunately, the operator of walk-behind mowers such as these is forced to continually walk during mowing operations, thereby leading to fatigue. This is, of course, a disadvantage associated with walk-behind mowers, especially in hilly environments. As a result of operator fatigue, mowers controlled by walking operators are generally less productive over extended periods of time. A further disadvantage of walk-behind mowers is that the operator's feet are left unprotected and thus exposed to potentially dangerous flying debris.

Turning now to power mowers operated by seated occupants, U.S. Pat. Nos. 3,483,682; 4,487,006; 4,316,356; and 4,998,948 disclose typical such mowers. Unfortunately, seated occupant operated mowers tend to have fairly high centers of gravity (i.e. they are top heavy) due to the position of the operator's center of gravity which is far from the ground. Such high centers of gravity render mowers operated by seated occupants more likely to tip or roll. Because tipping and rolling is more likely to occur as such mowers operate through turns or on hills, seated operators must be very careful in such environments and work at reduced speed. Operation at reduced speeds clearly leads to reduced productivity of the mower. Additionally, seated operators have a hard time ducking under low hanging tree limbs and the like because of the fixed position of the seat and thus the lower half of the operator's body. Furthermore, seat assemblies on such mowers necessarily increase the overall cost of the mowers.

U.S. Pat. Nos. 2,354,576; 3,485,314 and 5,004,251 disclose power devices operated by standing-occupants supported on trailers or sulkies. The operators of these devices (e.g. power mowers) are supported on sulky devices or trailers removably attached to the mower. Thus, the standing-operator supporting trailing platforms of these patents are not actually part of the mower, but rather are mower attachments which must be removed or folded up during mower transport. While the trailing platforms or sulky devices of U.S. Pat. Nos. 2,354,576 and 5,004,251 provide for mower operation by a standing-occupant, they greatly extend the overall length of the mower system and are rather bulky in nature. Thus, the sulky or standing-occupant platforms of these patents must be disconnected or folded up during transport of the mower. This is extremely burdensome and inconvenient. A further problem with removable trailing platforms such as those disclosed in U.S. Pat. Nos. 5,004,251 and 2,354,576 is that they significantly extend the length of the mower thereby decreasing maneuverability in tight spaces. Additionally, because these sulky or attachment devices are not actually part of the mower, they must often be purchased separately thus increasing the overall cost of the mower system.

U.S. Pat. No. 4,878,339 discloses a power lawn mower including a selectively deployable riding platform for supporting a standing-operator or occupant. The mower of U.S. Pat. No. 4,878,339 may be operated either as a walk-behind mower or alternatively as a standing-occupant/operator mower depending upon whether or not the standing-operator platform is deployed. In other words, because the platform is selectively deployable it is non-fixedly mounted to the mower. Unfortunately, in the walk-behind mode, this mower experiences the above-referenced problems associated with typical walk-behind mowers.

In the standing-operator mode (i.e. when the riding platform is deployed), the power mower of U.S. Pat. No. 4,878,339 experiences numerous problems. Firstly, the position of the riding platform behind the rear drive wheel axis lengthens the overall length of the mower and renders it difficult to maneuver in tight areas. Furthermore, while the platform of this patent provides for a fairly low center of gravity, its location behind the rear drive wheel axis and extension substantially behind the rear drive wheels renders it likely to bottom out or contact the ground when the mower goes over curbs, bumps, or the like.

If the power mower of U.S. Pat. No. 4,878,339 were operated so as to conduct a substantially zero-radius-turn, the rear drive wheels would be operated in opposite directions at similar speeds and the central turning point would be located between the rear wheels along the rear drive wheel axis. Because the standing-occupant platform of the mower of the '339 patent is not located at this central turning point (i.e. the platform is located well behind the rear drive wheel axis in the standing-operator mode), the operator is adversely affected by centrifugal force created during approximate zero-radius turns of the mower. The standing-operator is also more affected by centrifugal force created during other mower turns. Due to this centrifugal force, the standing-operator or occupant of the mower of the '339 patent is forced to take turns at slower speeds thus reducing the overall productivity of the mower over extended periods of time.

Another problem with the position of the platform of the U.S. Pat. No. 4,878,339 mower is that its location rearward of the rear drive wheel axis creates a greater tendency for the mower to "pop wheelies" upon acceleration, especially going up hills, because the mower's center of gravity is moved rearward when it is operated by a standing-occupant. The position of the platform of this patent often necessitates the standing-operator leaning forward prior to and during acceleration in order to avoid popping such wheelies and possibly tipping over the mower.

It is apparent from the above, that there exists a need in the art for a power lawn mower operable by a standing-occupant including a platform for supporting the standing-occupant, the platform being positioned on the mower so as to result in the following advantages: (i) a low mower center of gravity resulting in improved drive wheel traction and less susceptibility to tipping or rolling; (ii) a lessened overall length of the mower so as to render it highly maneuverable in tight spaces and environments; (iii) a reduced tendency of the standing-operator platform to bottom out or contact the ground when the mower goes over curbs, bumps, or the like; (iv) a platform positioned in a zero-turning-radius mower such that the operator is substantially unaffected by centrifugal force created during approximate zero-radius turns, thereby allowing the operator/mower to take such turns at higher speeds; (v) a platform positioned in a manner such that the mower is less likely to pop wheelies upon acceleration; etc. Each of the above advantages is accomplished by positioning the standing-operator platform of the mower substantially between the rear drive wheels.

It is the purpose of this invention to fulfill the above-described needs in the art, as well as other needs which will become apparent to the skilled artisan from the following detailed description of this invention.

SUMMARY OF THE INVENTION

Generally speaking, this invention fulfills the above-described needs in the art by providing a zero-turning-radius power mower for operation by a standing-occupant, comprising:

an engine;

at least one cutting member powered by the engine;

first and second rear drive wheels each independently driveable in both forward and reverse directions so as to allow for substantially zero-radius turning of the mower about a turning point when the rear drive wheels are driven in a predetermined manner; and a riding platform for supporting the standing-occupant, the riding platform being located substantially at the turning point so that the standing-occupant is substantially unaffected by centrifugal force created during zero-radius-turning of the mower.

This invention further fulfills the above-described needs in the art by providing a power mower for operation by a standing-occupant, comprising:

an engine for driving a cutting member;

first and second rear drive wheels each rotatable about a common axis;

a riding platform fixedly mounted on the mower for supporting the standing-occupant, the platform being located between the first and second rear drive wheels during operation of the mower so that when the standing-occupant stands on the platform the standing-occupant is between the first and second rear drive wheels along the axis, whereby the platform is less susceptible to impacting the ground when going over bumps and the like.

This invention will now be described with respect to certain embodiments thereof, accompanied by certain illustrations, wherein:

IN THE DRAWINGS

DETAILED DESCRIPTION OF CERTAIN EMBODIMENTS OF THIS INVENTION

Figure 1:
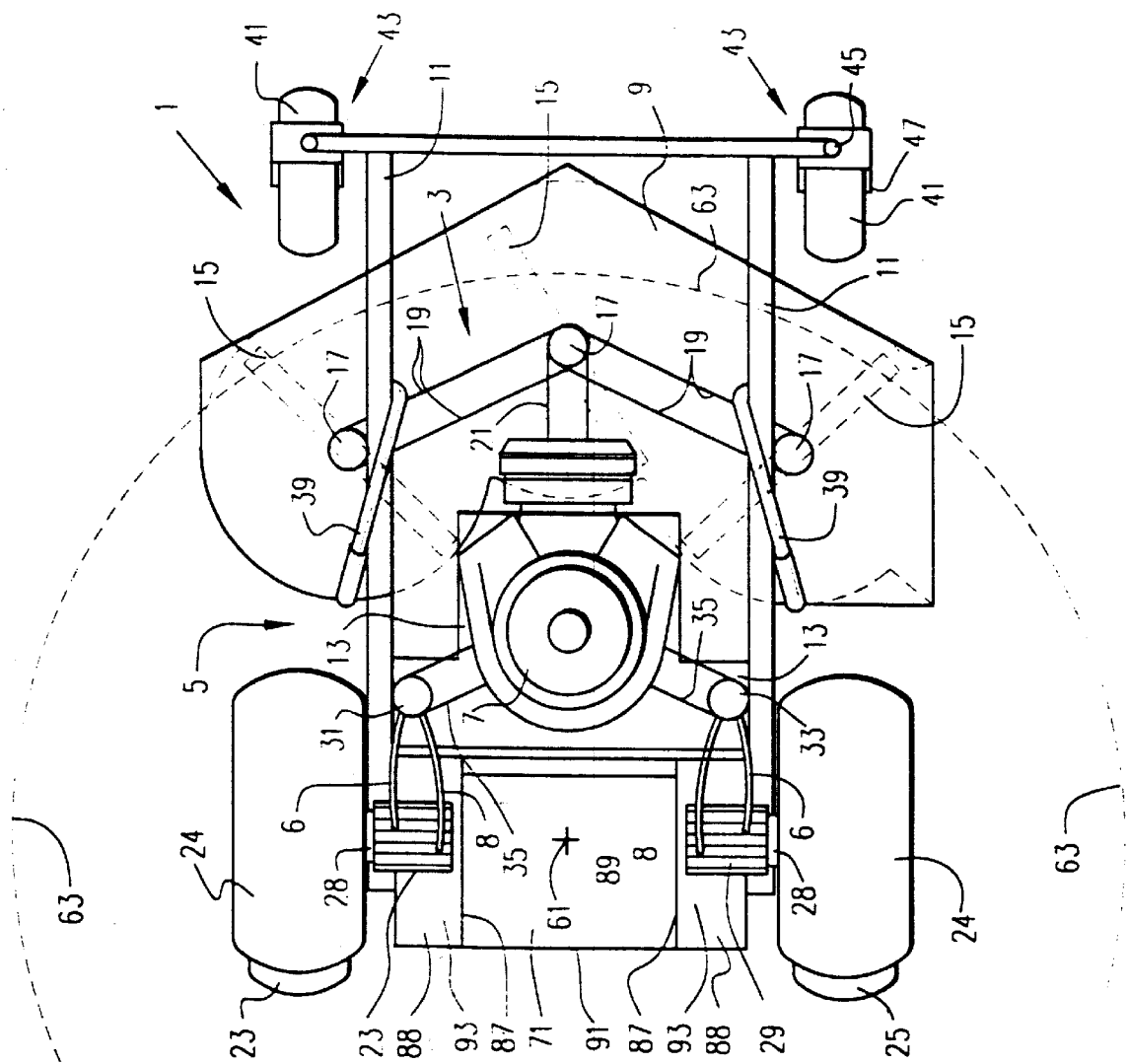
FIG. 1 is a top view of a zero-turning-radius power lawn mower according to certain embodiments of this invention.

Referring now more particularly to the accompanying drawings in which like reference numerals indicate like parts throughout the several views.

Figure 2:
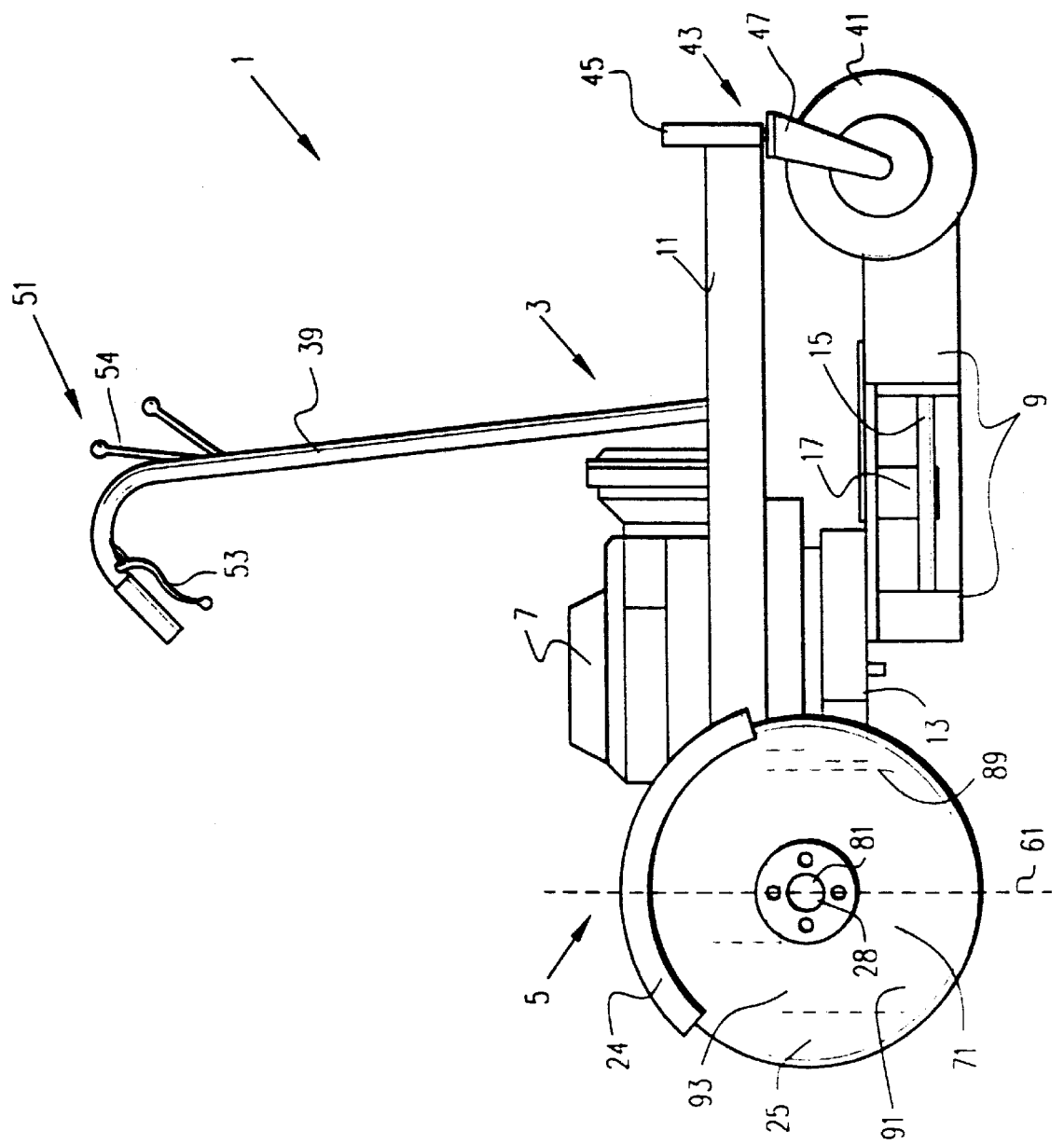
FIG. 2 is a side elevational view of the power mower of FIG. 1 according to certain embodiments of this invention.

FIGS. 1 and 2 are top and side views respectively of power lawn mower 1 according to a first embodiment of this invention. Power lawn mower 1 includes cutter assembly 3 and drive assembly 5.

Cutter assembly 3 includes engine 7 and cutter or mower deck 9. Mower deck 9 is mounted on and below frame 11 in front of engine 7 and engine deck 13. Mower deck 9 is positioned close to the ground below engine deck 13, engine 7, and frame 11 in certain embodiments of this invention. In the first embodiment as shown in FIG. 2, mower deck 9 is mounted on and connected to both engine deck 13 and frame 11. Frame 11 includes a pair of substantially parallel frame members which extend longitudinally along mower 1. Mower deck 9 (or alternatively the mower wheels) is vertically moveable or adjustable so as to adjust the height of the cut. Deck 9 may be about 36–72 inches wide according to certain embodiments.

Mounted below mower deck 9 is one or more (e.g. three) cutting members or blades 15 which rotate in a horizontal plane on vertical shaft(s) 17 which are coupled to engine 7 by way of a belt drive assembly including belts 19 and 21. Three cutting blades 15 and corresponding shafts 17 are provided in the first embodiment. Alternatively, as few as one blade 15 and as many as five blades 15 may be provided in certain other embodiments of this invention.

As shown in FIG. 1, drive belt 21 is coupled between the central vertical shaft 17 and engine 7. Secondary blade belts 19 are connected between the central vertical shaft 17 and the two peripheral shafts 17 respectively. Thus, belts 19 are driven as a result of central shaft 17 being driven by belt 21 which is coupled to and powered by engine 7. Cutter assembly 3 and its associated drive and engine 7 are conventional in nature and therefore will not be discussed in further detail.

Drive assembly 5 includes engine deck 13 for supporting conventional gasoline engine 7 (e.g. 2 cylinder, 22 HP, V-twin), rear drive wheels 23 and 25, hydraulic pumps 31 and 33, motors 27 and 29, etc. Each drive wheel assembly includes a protective fender 24. First and second rear drive wheels 23 and 25 are mounted either directly or indirectly on mower frame 11 and are generally disposed on opposite sides of engine 7. Hydrostatic drive wheel motors 27 and 29 are mounted on mower 1 so as to drive wheels 23 and 25 respectively. Hydrostatic pumps 31 and 33 are mounted on either engine deck 13 or frame 11 as shown. Hydrostatic pump 31 is in communication with motor 27 and left rear drive wheel 23 while hydrostatic pump 33 communicates with hydrostatic motor 29 and right rear drive wheel 25.

Each rear drive wheel 23 and 25 is mounted on its own drive axle 28 in certain embodiments of this invention. Axle 28 for wheel 23 may be part of motor 27 or alternatively may be separate from motor 27. The same is true for axle 28 upon which rear wheel 25 is mounted. In certain other embodiments of this invention, both rear drive wheels 23 and 25 may be mounted on a single supporting axle.

Hydrostatic pumps 31 and 33 are in conventional communication with hydrostatic motors 27 and 29 by way of, for example, a plurality of hydraulic fluid hoses 6 and 8 disposed between each pump and corresponding motor. Pumps 31 and 33 including known swash plates (not shown) and generate hydraulic fluid pressure which is translated through one of two hoses 6 and 8 connecting each pump (31 or 33) to its motor (27 or 29). Hydraulic hoses 6 and 8 are coupled between each pump (31 and 33) and its motor (27 and 29) so as to allow hydraulic fluid to flow in both directions between each pump and its motor. One hydraulic hose (6 or 8) is for allowing hydraulic fluid to flow in one direction and the other hose is for permitting the fluid to flow in the opposite direction.

For example, when fluid flows from pump 33 (or 31) to right drive wheel motor 29 (or 27) via hose 6 and back to pump 33 through hose 8 then motor 29 and wheel 25 are driven in the forward direction. The speed at which wheel 25 is driven depends upon the rate of flow. However, when the fluid flow is reversed so that the fluid flows to motor 29 through hose 8 and back to pump 33 through hose 6, then motor 29 and wheel 25 are driven in the reverse direction.

Hydrostatic pumps 31 and 33 are driven by engine 7 by way of belts 35. Each pump 31 and 33 includes a conventional pump control lever (not shown) extending therefrom for permitting the standing-operator to control the speed and forward/reverse sense of each rear drive wheel via a lever 53 provided on the handle 39 of mower 1.

Alternatively, motors 27 and 29 could be positioned on frame 11 or deck 13 adjacent engine 7 so that rear drive wheels 23 and 25 could instead be driven by chains in a known manner.

Front caster wheels 41 are mounted at the front of mower deck 9 or frame 11 by way of conventional caster assemblies 43. Each caster assembly 43 includes caster pivot 45 and caster support 47. Caster assemblies 43 allow mower 1 to be turned in any and all directions by rear drive wheels 23 and 25 as will be discussed more fully below.

Upwardly extending handles are provided for handling and manipulating mower 1 and include a pair of handle members 39 and optionally a cross member (not shown) secured between handle members 39 to hold them structurally substantially parallel to one another in a spaced apart manner. Each handle member 39 is connected to either frame 11 or mower deck 9 by way of bolts, screws, welds, or any other conventional connectors. Handle members 39 extend upwardly and slightly rearwardly toward the standing-operator according to certain embodiments of this invention so as to allow the operator to grip handles 39 and thereby control mower 1 via various controls (all of which are not shown) mounted on handles 39.

Speed and turning control assembly 51 is attached to handle members 39 near the gripping portions thereof and includes speed control levers 53 connected to each handle 39. Each speed control lever 53 which is pivotally mounted on a handle member 39 is conventionally coupled to one of pumps 31 or 33 by way of their control lever (not shown) so that the lever 53 mounted on left handle 39 is coupled to left pump 31 and controls the speed of left rear drive wheel 23 and the other lever 53 which is mounted on right handle 39 controls the speed of right rear drive wheel 25 via right hydrostatic pump 33 and motor 29.

The direction (forward/reverse) that each drive wheel 23 and 25 is driven is also conventionally controlled by the standing-operator via control levers mounted on handles 39. Speed control levers 53 may also be used to control the direction or, alternatively, different levers 54 can be coupled to pumps 31 and 33 for controlling direction in a known manner.

In operation, when engine 7 is running, hydrostatic pumps 31 and 33 are driven at substantially the same speed. Hydraulic fluid under pressure is variably delivered to wheel motors 27 and 29 through first and second conduits 6 and 8 extending between each pump and its respective motor. When the direction of fluid flow is to the motor is through the first conduit 6 and return flow to the pump through the second conduit 8, the motor (27 or 29) is driven in the forward direction so that its respective drive wheel (23 or 25) is also driven in the forward direction. On the other hand, when the fluid flow is in the opposite direction (i.e. going from the pump to the motor through the second conduit 8 and returning to the pump through the first conduit 6) this will cause the motor to operate in the reverse direction so as to cause its respective drive wheel to be driven rearwardly. Whether or not drive wheels 23 and 25 are driven in either the forward or rearward direction is determined by the position of the above discussed control levers mounted on each handle member 39.

In such a manner, the standing-operator may conventionally manipulate the control levers so as to cause rear drive wheels 23 and 25 to either: (i) both be driven in the forward direction; (ii) both be driven in the rearward direction; or (iii) one be driven in the forward direction with the other being driven in the rearward direction.

In certain embodiments of this invention, a 1–2 gallon hydraulic fluid reservoir (not shown) for pumps 31 and 33 is mounted on and between handle members 39 substantially above pumps 31 and 33. Conventional clutch and brake levers (not shown) may also be mounted on handles 39 in certain embodiments of this invention.

Turning of mower 1 is carried out in one of three ways. Firstly, the standing-operator can cause mower 1 to turn in either direction by stopping one of the two rear drive wheels 23 and 25 (e.g. via clutch or brake) while allowing the other to continue to be driven in either the forward or reverse direction. This may be carried out via the conventional handle 39 mounted control levers. Secondly, the standing-operator can cause the mower to turn by allowing drive wheels 23 and 25 to be driven in the same direction (forward or reverse), but at different speeds. Thirdly, the operator can turn mower 1 by causing rear drive wheel 23 to be driven in one direction and the other drive wheel 25 to be driven in the opposite direction.

When rear drive wheels 23 and 25 are driven in opposite directions at substantially similar speeds, substantial zero-radius-turning is accomplished about center point 61 of circle 63. In zero-radius-turning, mower 1 turns either leftwardly or rightwardly (depending upon which drive wheel is being driven forward) about central point 61. Thus, circle 63, as illustrated, shows the path along which the front portion of mower 1 proceeds during substantial zero-radius-turning. During substantial zero-radius-turning of mower 1, central point 61 of circle 63 is positioned along or near the rear drive wheel axis as shown in FIGS. 1 arid 2. Accordingly, what is meant by "zero-radius-turning" is that mower 1 turns about a point 61 disposed between the drive wheels, and that point 61 does not move to any great extent during the turning.

Platform 71 for supporting the standing-operator or occupant is disposed between rear drive wheels 23 and 25 along rear drive wheel axis 81 which is defined by the rear drive wheel's axes of rotation. By positioning standing platform 71 between rear drive wheels 23 and 25 substantially along drive wheel axis 81 so as to include central point 61, the standing-operator is substantially unaffected by centrifugal force created during approximate zero-radius-turning of mower 1.

For example, if during a substantially zero-radius-turn of mower 1, the operator was positioned at a location distant from central point 61 (e.g. along the front of mower deck 9 or far rearward of wheels 23 and 25, for example) then he would be adversely affected by centrifugal force created during the turn in that the operator would be pushed away from point 61 by the centrifugal force. However, when the standing-operator is located at or very near central point 61 due to the position of standing platform 71, he is substantially unaffected by such centrifugal force and therefore can operate mower 1 so as to take such approximate zero-radius turns at higher speeds. Furthermore, by positioning the standing-operator on substantially flat platform 71 in close proximity to central point 61, the operator is less affected by centrifugal force created during other (non-zero-radius) turns undertaken by mower 1. The less the operator is affected by such centrifugal force, the less fatigued he becomes and the higher speeds he may allow or cause mower 1 to take such turns.

Standing platform 71, as illustrated in FIG. 2, is positioned below rear drive wheel axis 81 thereby enabling the standing-operator to locate his weight near the ground during normal mower operations thus resulting in an effective mower center of gravity which is also close to the ground. This position of platform 71 allows the standing-operator's weight to be focused at a point below rear drive axis 81 during typical operations of mower 1 according to certain embodiments. In side hill environments, the operator is thus permitted to shift his weight in order to compensate for tipping tendencies. The resulting low center of gravity renders mower 1 safer in that it is less susceptible to tipping or rolling, especially in hilly environments. Furthermore, this low center of gravity focused along rear drive wheel axis 81 creates improved traction of rear drive wheels 23 and 25, especially during side hill mowing operations.

Platform 71 is surrounded or defined on its wheel sides by sidewalls 87 and on its engine or front side by wall 89. Motors 27 and 29 are at least partially encased behind sidewalls 87 and within compartments 88 defined thereby. Alternatively, motors 27 and 29 may be fully encased within compartments 88. Sidewalls 87 and 89 which define platform 71 protect the operator's feet and lower legs from hazards associated with engine 7, motors 27, 29, blades 15, etc. while bottom wall 91 of platform 71 protects the operator from hazards beneath the mower such as blades 15 and flying debris.

The tops of sidewalls 87 define flat supports 93 upon which the standing-operator may position his feet when he needs to increase the weight or improve the traction of one of the rear drive wheels. This is especially helpful in side hill environments when improved traction is often required on the top (or highest) rear drive wheel (25 or 23). Because the operator is standing on platform 71, he can easily shift his weight to a side of the machine needing either additional tire traction or additional weight for counterbalancing tipping.

Another advantage associated with the positioning of standing platform 71 between rear drive wheels 23 and 25 is that platform 71 is unlikely to bottom out or contact the ground when mower 1 goes over bumps, curbs, and the like. If, for example, platform 71 were located well behind rear drive wheels 23 and 25 as in the prior art, it would significantly increase the likelihood of the platform bottoming out as the mower traveled in a forward direction over a curb or other similar bump. However, positioning platform 71 between the rear drive wheels and along rear drive wheel axis 81 in certain embodiments of this invention creates a situation where the possibility of standing-operator platform 71 bottoming out as the mower goes over bumps, curbs, and the like is virtually eliminated.

The positioning of platform 71 between rear drive wheels 23 and 25 along rear drive wheel axis 81 also results in mower 1 being less susceptible to popping wheelies when the mower is accelerated, especially when going up hills. This is because the positioning of the standing-operator's weight along rear drive wheel axis 81 (as opposed to at a location behind the rear drive wheels) results in the mower's center of gravity being closer to the front of the mower thereby resulting--in it being less likely to pop wheelies upon acceleration.

It is noted at this point that in the prior art, burdensome counterweights (not shown) often had to be affixed to the front of walk-behind power mowers in order to move the mower's center of gravity forward so that the mower would not pop wheelies upon acceleration.

Yet another advantage of platform 71 being disposed between rear drive wheels 23 and 25 (as opposed to at a position rearwardly thereof) is that there is no longer a need for disposing such counterweights along the front of the mower. This is because the operator's weight is located substantially along the rear drive wheel axis, and not at some position rearwardly thereof which requires the positioning of counterweights on the front of the mower. Accordingly, the position of platform 71 also allows engine 7 to be located more rearwardly than in the prior art, thus resulting in a larger mower deck 9 and more room for repairs and other such needs.

Mower 1, as described above, has a reduced overall length with respect to certain prior art mowers as a result of platform 71 being located between rear drive wheels 23 and 25 (as opposed to rearwardly thereof). This allows the mower to be more easily and efficiently operated in tight locations and, in fact, permits mower 1 to access regions previously unaccessible. The shorter overall length of mower 1 also allows for more compact storage and transport. Furthermore, by allowing the standing-operator to be between the rear wheels, the operator is less likely to impact obstacles such as trees and the like during mower operations in tight environments such as woods, heavy brush, etc.

While certain preferred embodiments of this invention involve power lawn mowers, the standingoperator platform of this invention may also be placed between the rear drive wheels of other power driven devices such as soil or lawn aerators, or other powered lawn maintenance devices.

According to certain alternative embodiments, a operator seat could be positioned at point 61 so as to make the mower a seated-operator type mower.

Once given the above disclosure, therefore, various other modifications, features, or improvements will become apparent to the skilled artisan. Such other features, modifications, and improvements are thus considered a part of this invention, the scope of which is to be determined by the following claims.

We claim:

1. A zero turning radius power lawn mower for operation by at least a standing operator, the mower comprising:

first and second rear drive wheels which are driveable in a pre-determined manner so as to enable zero radius turning of the mower about a vertically extending zero radius turning axis disposed between the rear drive wheels;

an engine deck for supporting an engine;

at least one handle member having a hand grip portion, said hand grip portion being located forward of said vertically extending zero radius turning axis;

a foot platform for supporting at least one foot of the standing operator when the operator is operating the mower in a standing position, wherein at least a portion of said foot platform is located at an elevation below a top edge of at least one of the first and second rear drive wheels;

wherein said vertical zero radius turning axis intersects a portion of said foot platform; and wherein a plane defined by said engine deck is at an elevation above a foot supporting surface of said foot platform.

2. A method of operating a zero turning radius power lawn mower, the method comprising the steps of:

providing first and second rear drive wheels which are driveable in a pre-determined manner so as to enable zero radius turning of the mower about a vertically extending zero radius turning axis disposed between the rear drive wheels;

providing an engine deck for supporting an engine;

providing at least one handle member having a hand grip portion, said hand grip portion being locateable forward of the vertically extending zero radius turning axis;

positioning at least a portion of said foot platform at an elevation below a top edge of at least one of the first and second rear drive wheels, an operator standing, via at least one foot, on a foot platform for supporting at least one foot of the standing operator when the operator is operating the mower in a standing position; and the standing operator manipulating handle controls of the mower and conducting an approximate zero radius turn about the vertical zero radius turning axis in a manner such that during conducting of the approximate zero radius turn the vertical zero radius turning axis intersects a portion of the foot platform and a portion of the standing operator's body.

* * * * *